(12) United States Patent
Kwon et al.

(10) Patent No.: US 8,194,345 B2
(45) Date of Patent: Jun. 5, 2012

(54) METHOD AND APPARATUS FOR DAMPENING AND FILTERING AIR FLOW EFFECTS IN A HARD DISK DRIVE

(75) Inventors: Haesung Kwon, San Jose, CA (US); Hyung Jai Lee, Cupertino, CA (US)

(73) Assignee: Seagate Technology International

( * ) Notice: Subject to any disclaimer, the term of this patent is extended or adjusted under 35 U.S.C. 154(b) by 997 days.

(21) Appl. No.: 12/170,339

(22) Filed: Jul. 9, 2008

(65) Prior Publication Data

US 2010/0007987 A1 Jan. 14, 2010

(51) Int. Cl.
*G11B 33/14* (2006.01)

(52) U.S. Cl. .................. 360/97.19; 360/97.13

(58) Field of Classification Search ............. 360/97.02, 360/97.03, 97.12, 97.13, 97.14, 97.19
See application file for complete search history.

(56) References Cited

U.S. PATENT DOCUMENTS

| | | | | |
|---|---|---|---|---|
| 5,696,649 A * | 12/1997 | Boutaghou | ............ | 360/97.03 |
| 5,757,587 A * | 5/1998 | Berg et al. | ............ | 360/254.7 |
| 6,008,965 A * | 12/1999 | Izumi et al. | ............ | 360/97.03 |
| 6,271,987 B1 * | 8/2001 | Allsup et al. | ............ | 360/97.03 |
| 6,487,038 B1 * | 11/2002 | Izumi et al. | ............ | 360/97.02 |
| 6,535,350 B1 * | 3/2003 | Genheimer et al. | ....... | 360/97.02 |
| 6,700,736 B1 * | 3/2004 | Wu et al. | ............ | 360/97.03 |
| 6,717,768 B2 * | 4/2004 | Kim | ............ | 360/97.02 |
| 6,747,840 B2 * | 6/2004 | Daniel et al. | ............ | 360/97.01 |
| 6,961,211 B2 * | 11/2005 | Takeda | ............ | 360/98.08 |
| 7,002,774 B2 * | 2/2006 | Adams | ............ | 360/97.02 |
| 7,307,811 B2 * | 12/2007 | Xu et al. | ............ | 360/97.01 |
| 7,327,530 B2 * | 2/2008 | Lee et al. | ............ | 360/97.02 |
| 7,349,178 B2 * | 3/2008 | Tadepalli et al. | ........ | 360/97.02 |
| 7,355,811 B1 * | 4/2008 | Gifford et al. | ............ | 360/97.02 |
| 7,397,631 B1 * | 7/2008 | Suwito et al. | ............ | 360/97.03 |
| 7,420,775 B2 * | 9/2008 | Lim | ............ | 360/97.03 |
| 7,450,338 B2 * | 11/2008 | Hur | ............ | 360/97.02 |
| 7,450,339 B2 * | 11/2008 | Hirano et al. | ............ | 360/97.03 |
| 7,453,667 B2 * | 11/2008 | Cho et al. | ............ | 360/97.03 |
| 7,508,623 B2 * | 3/2009 | Gross | ............ | 360/97.02 |
| 7,511,917 B2 * | 3/2009 | Zuo et al. | ............ | 360/97.02 |
| 7,535,671 B2 * | 5/2009 | Suzuki et al. | ............ | 360/97.02 |
| 7,554,762 B2 * | 6/2009 | Suwa et al. | ............ | 360/97.02 |
| 7,616,402 B2 * | 11/2009 | Suwa et al. | ............ | 360/97.02 |
| 7,667,926 B2 * | 2/2010 | Naruse | ............ | 360/97.02 |
| 7,733,602 B2 * | 6/2010 | Gross et al. | ............ | 360/97.02 |
| 7,787,213 B1 * | 8/2010 | Michael et al. | ............ | 360/97.03 |
| 7,813,078 B1 * | 10/2010 | Gleason et al. | ............ | 360/97.02 |
| 2005/0063092 A1 * | 3/2005 | Xu et al. | ............ | 360/97.02 |
| 2005/0270691 A1 * | 12/2005 | Pottebaum et al. | ........ | 360/97.02 |
| 2007/0279799 A1 * | 12/2007 | Suwa | ............ | 360/97.01 |
| 2008/0094748 A1 * | 4/2008 | Han et al. | ............ | 360/97.03 |
| 2008/0278849 A1 * | 11/2008 | Kwon et al. | ............ | 360/97.02 |
| 2009/0002882 A1 * | 1/2009 | Yoshikawa et al. | ........ | 360/97.02 |
| 2010/0157469 A1 * | 6/2010 | Ichikawa et al. | ............ | 360/97.02 |
| 2010/0188777 A1 * | 7/2010 | Kwon et al. | ............ | 360/224 |

* cited by examiner

*Primary Examiner* — Brian Miller

(57) ABSTRACT

A hard disk drive is disclosed including at least one air filter mounted on a shroud wall of the base and at least two disk dampers where at least one disk damper covers a fraction of the maximal covering angle configured with the air filter to optimize both the air filter and disk dampening. Methods of manufacturing the hard disk drive are also disclosed.

9 Claims, 2 Drawing Sheets

METHOD AND APPARATUS FOR DAMPENING AND FILTERING AIR FLOW EFFECTS IN A HARD DISK DRIVE

TECHNICAL FIELD

This invention relates to hard disk drives including at least one air filter and at least two disk dampers.

BACKGROUND OF THE INVENTION

For several years, it has been common practice for hard disk drives to incorporate disk dampers near the surfaces of disks to reduce vibration caused by the wind from the rotating disk surfaces. The general rule of thumb has been that the disk dampers should cover a maximum of the disk surfaces to minimize the vibration effects, known herein as disk flutter suppression. It has also been common to include air filters in hard disk drives. However, it has not been generally known that these components can be optimized together to achieve better performance in new configurations for the hard disk drive.

SUMMARY OF THE INVENTION

One embodiment of the invention include a hard disk drive with at least one air filter mounted on a shroud wall of a base and at least two disk dampers where at least one of the disk dampers covers a fraction of the maximal covering angle configured with the air filter to optimize performance for both the air filter and the disk dampers. Such embodiments may have improved filtration performance with similar damping effect on wind-induced vibration when compared to a hard disk drive where all the disk dampers have the maximal covering angle. As used herein the covering angle is measured about the center of the disks and is the angle that the disk damper covers over at least one disk surface. The covering angle may further optimize power consumption.

The hard disk drive operates through the wind entering the intake and the second intake providing suction to pull the wind through the air filter to create filtered air sent through an outlet channel back into the disk cavity, which is optimized by the top disk damper being smaller than the bottom disk damper without appreciable decline in disk flutter suppression. When a third disk damper is present between the top and bottom dampers, it is smaller than the bottom and larger that the top disk damper and further aids the performance of the air filter.

Another embodiment of the hard disk drive includes the disk dampers in the opposite order, with the top disk damper having a larger covering angle the one below it and so on.

BRIEF DESCRIPTION OF THE DRAWINGS

FIG. 5 shows another example embodiment as a variant of FIG. 3, including the disk dampers in the opposite order, with the top disk damper having a larger covering angle the one below it and so on.

DETAILED DESCRIPTION

This invention relates to hard disk drives including at least one air filter and at least two disk dampers. Embodiments of the invention include a hard disk drive with at least one air filter mounted on a shroud wall of a base and at least two disk dampers where at least one of the disk dampers covers a fraction of the maximal covering angle configured with the air filter to optimize both the air filter and disk dampening. Such embodiments may have improved filtration performance with similar damping effect on wind-induced vibration, or disk flutter suppression, when compared to a hard disk drive where all the disk dampers have the maximal covering angle. As used herein the covering angle is measured about the center of the disks and is the angle that the disk damper covers over at least one disk surface.

Figure 1:
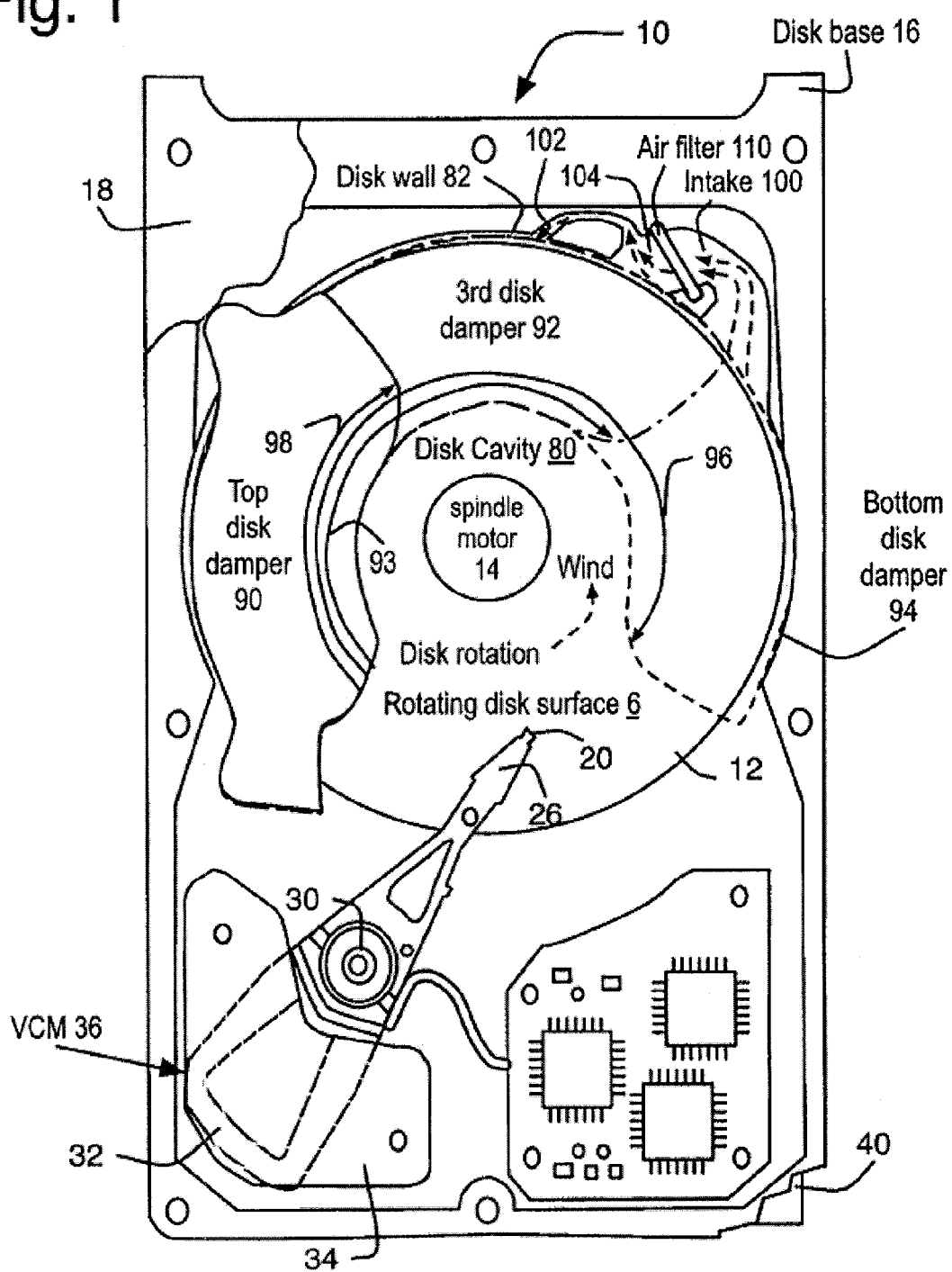
FIG. 1 shows an example embodiment of a hard disk drive that includes a base includes a shroud wall including an air filter between an intake and a second intake.

Referring to the drawings more particularly by reference numbers, FIG. 1 shows an example embodiment of a hard disk drive 10 that includes a base 16 that includes a shroud wall 82 including an air filter 110 between an intake 100 and a second intake 104. A spindle motor 14 is mounted on the base and is coupled to rotate multiple disks 12 in the disk cavity formed by the shroud wall. A wind is generated off a rotating disk surface 6 as the spindle motor rotates the disks. The hard disk drive includes three disk dampers separating the disks, with a top disk damper 90, a bottom disk damper 94 and a third disk damper 92 between the top and bottom disk dampers. The top disk damper 90, the bottom disk damper 94, and the third disk damper 92 can have similar arc shapes of different sizes, be essentially parallel to the disks, have one or more of the edges vertically aligned, or a combination thereof. The covering angle 98 of the top disk damper is less than the covering angle 93 of the third disk damper, which is less than the maximal covering angle 96 of the bottom disk damper. For example, the covering angle 96 of the bottom disk damper 94 can be the maximal covering angle 96 or less. Also, the covering angle 98 of the top disk damper 90 can be at least 30% of the maximal covering angle 96 and at most 80% of the maximal covering angle 96. Further, the covering angle 93 of the third disk damper 92 can be at least 50% of the maximal covering angle 96.

The hard disk drive 10 operates through the wind entering the intake 100 and the second intake 104 providing suction to pull the wind through the air filter 110 to create filtered air sent through an outlet channel 102 back into the disk cavity, which is optimized by the top disk damper 90 being smaller than the bottom disk damper 94 without appreciable decline in disk flutter suppression. The suction is often referred to as the Bernoulli effect. When the third disk damper 92 is present between the top and bottom dampers, it is preferably smaller than the bottom and larger that the top disk damper and further aids the performance of the air filter based upon extensive simulation analyses.

Embodiments of the invention include at least one air filter 110 mounted on the shroud wall 82 of the base 16 and at least two disk dampers where at least one of the disk dampers covers a fraction of the maximal covering angle 94 configured with the air filter to optimize both the air filter and disk dampening. Such embodiments may have improved filtration performance with similar damping effect on wind-induced vibration when compared to a hard disk drive where all the disk dampers have the maximal covering angle. As used herein the covering angle is measured about the center of the disks 12 and is the angle that the disk damper covers over at least one disk surface 6.

A voice coil motor 36 is mounted to the base 16 and includes at least one actuator arm for pivoting a head gimbal assembly 26 to position a slider 20 near a track on the rotating disk surface 6, all of which is affected by the air flow resulting from the configuration of air filter 110, the disk dampers 90, 92 and 94, the shroud wall 82, and the rotating disk surfaces. The voice coil motor pivots about the actuator pivot 30, moving in response to electrical stimulus the voice coil 32 and its interaction with a fixed magnet assembly 34. A disk cover 18 is mounted upon the base to encapsulate all of the shown components except the control circuit 40, which is usually mounted on the opposite side of the base.

Figure 2:
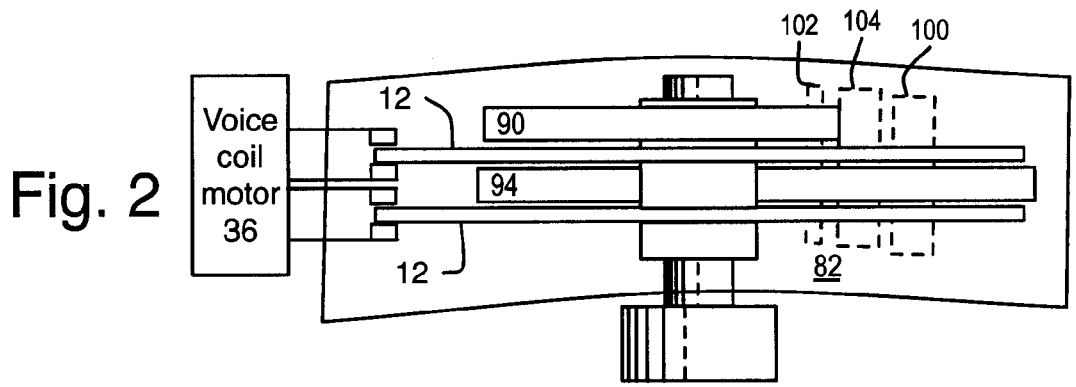
FIG. 2 shows a partial cross section view is the cross section of an example of the hard disk drive of FIG. 1, showing the top and bottom disk damper, the intake, the second intake and the outlet in use with two disks.

By way of example, FIGS. 2 to 5 shows embodiments of the hard disk drive 10 of FIG. 1 seen in partial cross section. FIG. 2 shows the hard disk drive including two disks 12, two disk dampers, in particular, the top damper 90 and the bottom damper 94, with the intake 100, the second intake 104, and the outlet 102 formed on the shroud wall 82.

Figure 3:
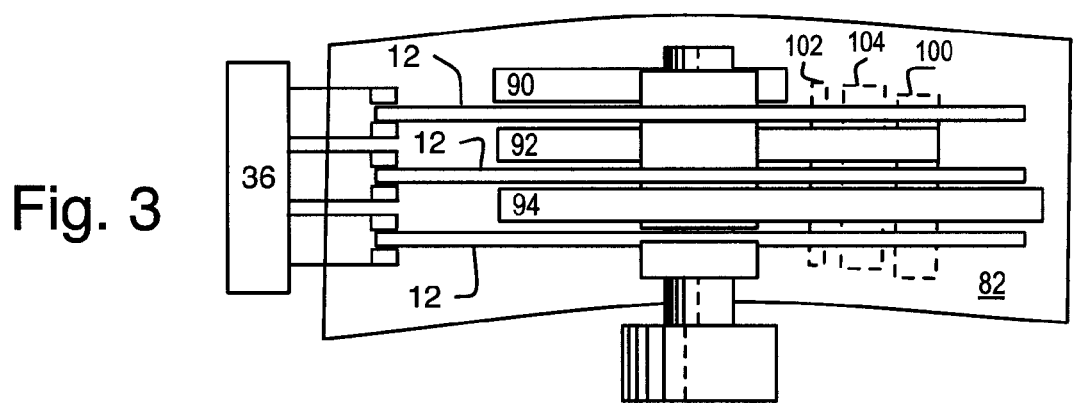
FIGS. 3 and 4 show partial cross section views of examples of the hard disk drive of FIG. 1, showing the three disk dampers, the intake, the second intake and the outlet in use with three disks.
Figure 4:
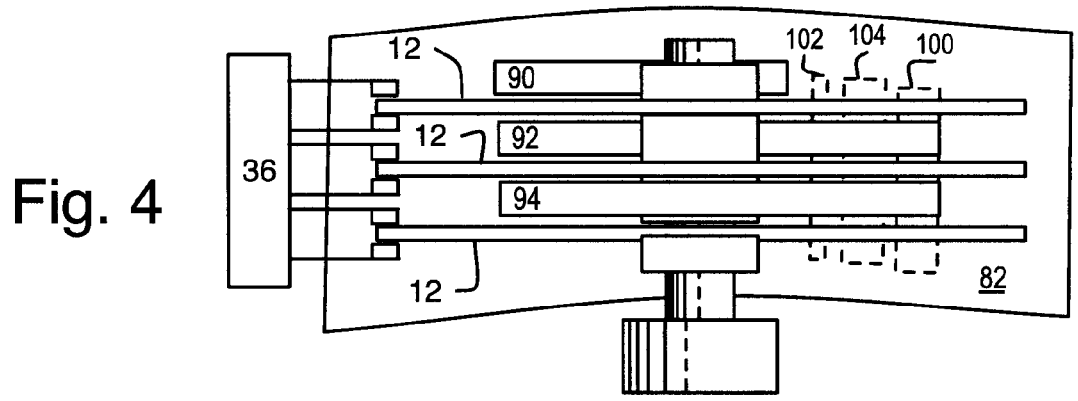
Figure 5:
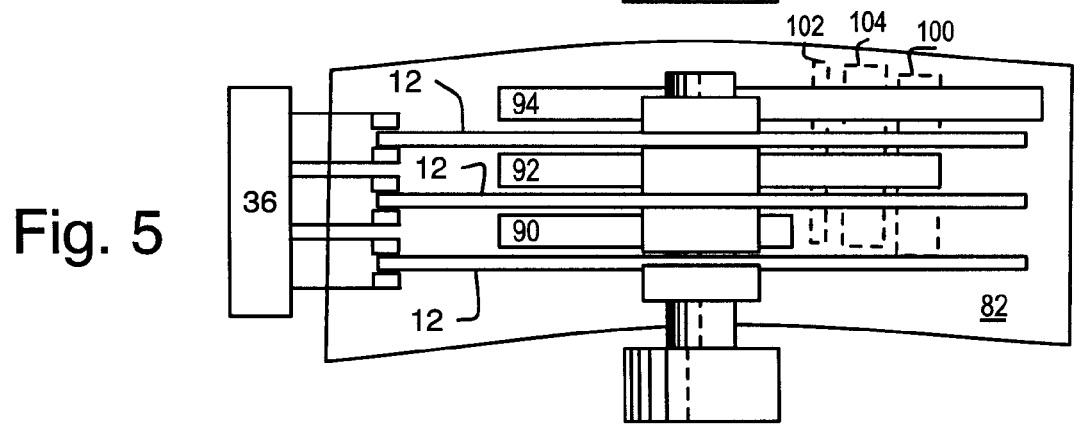

FIGS. 3 to 5 further show the hard disk drive 10 including three disks and a third disk damper 92 having a covering angle between the top disk damper 90 and the bottom disk damper 92. FIG. 3 shows the covering angle of the middle disk damp as less than the bottom disk damper as shown in FIG. 1, whereas FIG. 4 shows the middle disk damper having essentially the same covering angle as the bottom disk damper. FIG. 5 shows the embodiment of the hard disk drive with the opposite order to the disk dampers, with covering angle of the bottom disk damper less than the middle disk damper, which is less than the covering angle of the top disk damper. For example, the top disk damper 90 can be the maximal covering angle 96, the covering angle 96 of the bottom disk damper 94 can be at most 80% but greater than 30%, and the third covering angle can be at least 50%, both of the maximal covering angle 96.

The preceding embodiments provide examples of the invention, and are not meant to constrain the scope of the following claims.

What is claimed is:

1. A hard disk drive, comprising:
   a base including a shroud wall further including an air filter;
   a spindle motor mounted on the base and rotatably coupled to a bottom disk and a top disk;
   a first damper mounted to the shroud wall between the bottom disk and the top disk and having a first covering angle of at most a maximal covering angle; and
   a second damper mounted to the shroud wall and over the bottom disk and the top disk and having a second covering angle less than the first covering angle.

2. The hard disk drive of claim 1, wherein said shroud wall further includes a chamber including said air filter.

3. The hard disk drive of claim 2, wherein said shroud wall further includes a second chamber.

4. The hard disk drive of claim 1, further comprising:
   a middle disk rotatably coupled to the spindle motor and located between the first damper and the top disk; and
   a third damper mounted to the shroud wall between the top disk and the middle disk and having a third covering angle greater than or equal to the second covering angle and less than the maximal covering angle.

5. The hard disk drive of claim 1, wherein the second covering angle is at least thirty percent of the maximal covering angle and the third covering angle is at least fifty percent of the maximal covering angle.

6. The hard disk drive of claim 1, wherein the shroud wall includes:
   an intake, coupled to the air filter, for providing a first entrance for air current generated by the movement of the top disk, the bottom disk, the middle disk, or a combination thereof; and
   a second intake, connected to the intake, for creating a pulling force for the air current entering through the intake by providing a second entrance for the air current.

7. The hard disk drive of claim 1, wherein the shroud wall includes:
   an intake, coupled to the air filter, for providing an entrance for air current generated by the movement of the the top disk, the bottom disk, the middle disk, or a combination thereof; and
   an outlet channel, connected to the intake and having a smaller cross-section than the intake, for providing an exit for the air current.

8. The hard disk drive of claim 1, wherein the first covering angle is at most eighty percent of the maximal covering angle.

9. A method of manufacturing a hard disk drive, comprising the steps of:
   providing a base including a shroud wall including an air filter;
   assembling a first damper between a bottom disk and a top disk with a second damper over the bottom disk and the top disk, all rotating coupled to a spindle motor;
   mounting the spindle motor to the base;
   mounting the first damper and the second damper to the shroud wall;
   wherein assembling includes:
   providing the first damper having a first covering angle of at most a maximal covering angle, and
   providing the second damper having a second covering angle less than the first covering angle and the maximal covering angle.

* * * * *